United States Patent
Burns

[11] 3,867,011
[45] Feb. 18, 1975

[54] CENTER ATTACHED OPTICAL MOUNT
[75] Inventor: Richard H. Burns, Webster, N.Y.
[73] Assignee: Bausch & Lamb Incorporated, Rochester, N.J.
[22] Filed: Feb. 5, 1973
[21] Appl. No.: 329,778

[52] U.S. Cl. .................................. 350/16, 350/310
[51] Int. Cl. .......................................... G02b 23/16
[58] Field of Search ...... 350/16, 310; 356/148, 149, 356/248, 250

[56] References Cited
UNITED STATES PATENTS
2,944,783   7/1960   Macleish et al................... 350/16 X
3,711,178   1/1973   Humphrey ........................... 350/16

Primary Examiner—David H. Rubin
Attorney, Agent, or Firm—Frank C. Parker; Harry C. Post, III

[57] ABSTRACT

A device for mounting a stabilized optical element having a central aperture formed therethrough. The device includes a coiled spring wire that is attached at one end to a mounting portion, at its other end to a rod extending from the mounting portion, and at locations between its two ends to the optical element.

2 Claims, 1 Drawing Figure

PATENTED FEB 18 1975 3,867,011
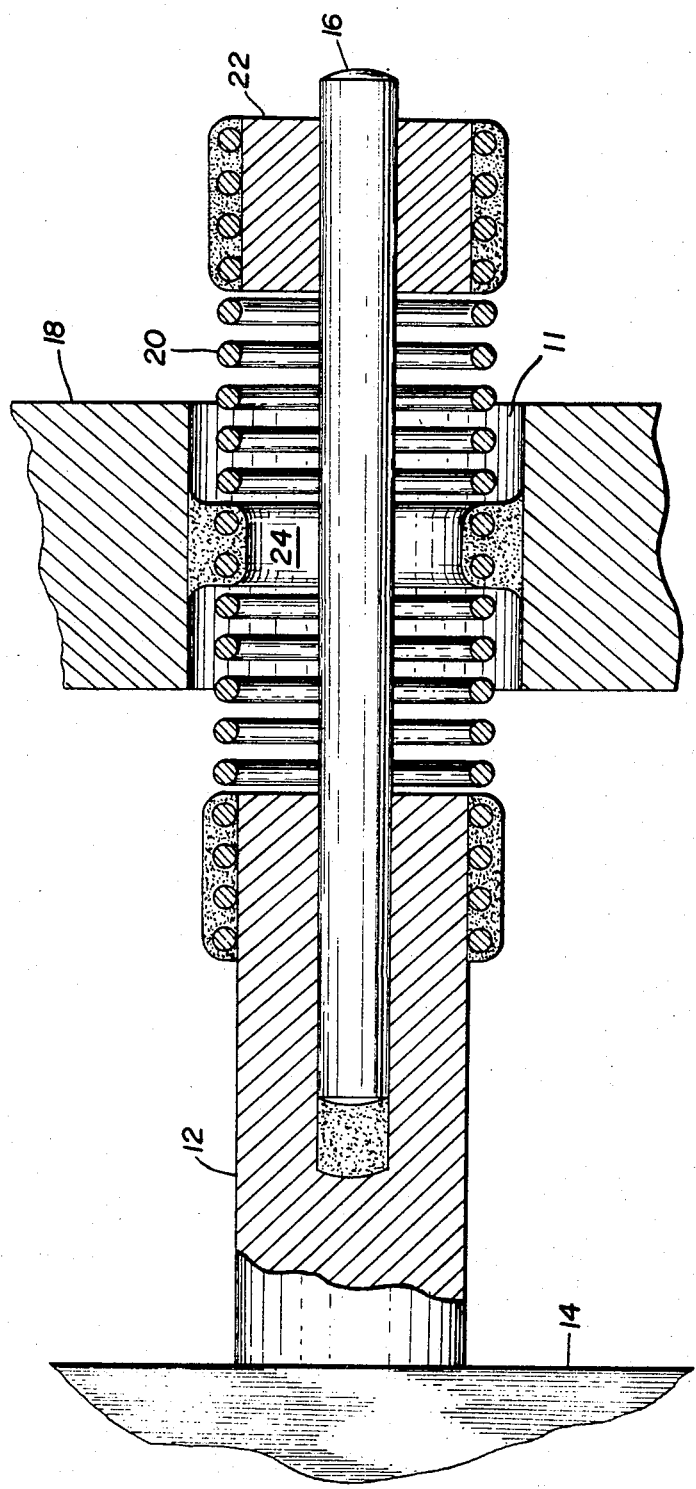

CENTER ATTACHED OPTICAL MOUNT

BACKGROUND OF THE INVENTION

1. Field of the Invention

The invention lies in the field of optical mounting mechanisms, and more particularly in the field of pivotal mounts for optical members immersed in fluids.

It is especially concerned with mounting mechanisms used in systems which stabilize optics against small-angle deviations thereof from a desired line of sight.

2. Description of the Prior Art

Optical stabilization or accidental-motion compensation is of great importance in hand-held instruments and in instruments which are mounted on moving or vibrating platforms such as tanks, aircraft, ships and the like, wherein a substantial magnification is desired. Stabilization means are adapted to filter out high frequency angular motions of small amplitude while at the same time passing or transmitting low frequency angular motion of large amplitude such as occurs when the instrument is panned. It is almost impossible for a hand held optical device such as a camera or telescope to be maintained entirely free from slight motions or tremors which in the absence of stabilization causes a focused image to move or "dance." This problem becomes increasingly apparent with increased magnification as optical magnifying systems not only magnify the image viewed but also magnify relative motion thereof.

An optical train in a telescope for example, can be stabilized by placing a stabilized optical member, such as a mirror, between the objective lens and the imaging plane of the instrument. The optical member supported in a fluid filled chamber or cell is coupled by the fluid to the walls of the chamber and will undergo a proportional movement with reference to inertial space when the chamber is moved with reference to inertial space.

The known mounting means for immersed optical members in hydrostatic optical stabilizer cells or chambers includes means extending from a wall of such cells to the backs of such members. The extended portion may include merely a needlepoint upon which the optical member pivots, the optical member being biased in place magnetically. Such support means are not wholly satisfactory since localized magnetic aberrations upset the optical alignment, and the accomplishment of the original alignment is therefore a difficult and tedious procedure.

Another known mounting means comprises a very small diameter (perhaps 0.002 inches) wire cemented at one end to the optical member and at the other to an arm extending from the chamber wall. To be sufficiently flexible such a wire must be extremely thin and is therefore very fragile. Such wires break easily or may pull out of their mounts if the optical member is bumped, as frequently happens during assembly. Another prior art mount utilized a flexible shaft connection between the optical member and the cell. Still another prior art mount utilized a coiled, resilient wire as the connection between the optical member and the cell. The flexible mounts proved superior to the magnetic mountings which are sensitive and difficult to adjust, but the flexible mounts suffer from a tendency of the optical member to float up or sink as the relative density of its immersion fluid changes with temperature.

Still another prior art mount comprises a thin elastic member or thread forced through the optical member and attached to the front and rear of the cell. This type of mount operates when the elastic is stretched by the hydrostatic forces in the cell which is functionally different from the function of the spring in the present invention.

SUMMARY OF THE INVENTION

The present invention, used in a hydrostatic optical stabilizer, presupposes an optical member having a particular overall density immersed in a transparent fluid having a density equal to that of the optical member at a convenient mid-range working temperature. In an actual instrument, working temperatures may be both above and below the selected temperature.

The optical member is neutrally buoyant at the nominal temperature, but it floats up when cooler temperatures make the immersion fluid more dense. Conversely, when higher temperatures thin out the immersion fluid, the optical member having a constant density tends to sink. Either sinking or rising displaces the optical member from its carefully chosen, aligned neutral position and tends to tilt it, thereby degrading the performance of the instrument.

In the present invention, a shaft extends from one wall of a chamber in which the fluid and optical member are confined and extends through an aperture in the optical member. A resilient coil is fixed to the shaft at a first location, to an extension of the shaft at a location spaced from the first location and the coil surrounds the shaft extension in spaced relation between the first and second locations. The optical member is centrally connected to a portion of the coil between the location of the coil fixed to the shaft and the location of the coil fixed to the shaft extension. The optical member pivots freely on the resilient coil within an angular range sufficient for purposes of stabilization. When the fluid temperature departs from the neutral range driving the optical member either up or down, the optical member is constrained symmetrically from both sides keeping it from tipping toward one side or the other. Accordingly, a temperature-related motion is accomplished by a lateral displacement normal to the ordinarily horizontal shaft. Such a lateral displacement does not have a severe effect upon the overall optical alignment of the instrument. If the optical member is a mirror, the effect is practically nil. Even when the instrument is tipped from the horizontal so that the shaft is similarly tipped the doubly constrained coil tends to hold the optical member's displacement to a course substantially normal to the shaft.

BRIEF DESCRIPTION OF THE DRAWINGS

The FIGURE is a sectional view of a portion of an optical stabilizer chamber showing an optical member mounted in accordance with the invention.

DESCRIPTION OF THE PREFERRED EMBODIMENT

In the FIGURE, a shaft 12 is affixed to and extends laterally from a wall 14 of a chamber containing a transparent fluid in an optical instrument, such as a telescope. A pin 16 of much smaller diameter than the shaft 12 extends as an axial continuation of the shaft 12 on through an aperture 11 formed in an optical member 18, such as a mirror or a prism. One terminal end of a resilient coil 20 circumscribes and is attached to the shaft 12 and the opposite terminal end of the coil 20 circumscribes and is affixed to a bushing 22 which is attached to the pin 16. The coil 20 may be cemented, bonded, or banded onto the shaft 12 and the bushing 22. The coil 20 is also fixed to the optical member 18 within its aperture at a point on the coil midway between the portions at which the coil is fixed respectively to the shaft 12 and the bushing 22. The location at which the optical member 18 is attached to the coil 20 is chosen to be substantially in the central plane of the optical member 18 and the result of these relationships is that the centers of gravity of both the optical member 18 and the section of the coil between the fixation points with the shaft and the bushing coincide.

The coil is of uniformly resilient character, typically rather weakly so, throughout its length, and since the optical member attachment is centered in the free portion, the coil urges equally and oppositely upon the optical member from both directions and tends to hold it in its medial, neutral position, whence it is aligned with a plurality of other optical elements within the incorporating instrument.

The central winding of the coil 20 is shown captured by cement so as to be affixed to the optical member 18. While the cementing can be accomplished in many way, a preferred technique is to fill the optical member aperture to just below the central winding of the coil with a substance not miscible with the cement. The cement is then introduced to cover the central winding or windings and allowed to set. Finally the blocking substance is dissolved by use of a solvent in which the cement is insoluble.

I claim:

1. A device for mounting an optical member within a chamber having at least one wall, the optical member having an aperture and being immersed in a transparent fluid contained within the chamber, comprising:
    a bushing means disposed within the chamber;
    shaft means being affixed to and extending from the wall of the chamber; and
    resilient coil means extending through the aperture of the optical member and having a first end and an opposite end, the first end being attached to a first location on said shaft means and the opposite end being affixed to a second location on said bushing means, and the optical member being connected within the aperture to said resilient coil means centrally of the first and second locations.

2. A device for mounting an optical member within a chamber having at least one wall, the optical member having an aperture and being immersed in a transparent fluid contained within the chamber, comprising:
    shaft means having a diameter and being affixed to and extending from the wall of the chamber;
    pin means of diameter smaller than said shaft means extending from said shaft means through the aperture of the optical member;
    bushing means being attached to said pin means; and
    resilient coil means being of helical configuration extending around said pin means and through the aperture of the optical member and having a first end and an opposite end, the first end being attached to a first location on said shaft means and the opposite end being affixed to a second location on said bushing means, and the optical member being connected within the aperture to said resilient coil means centrally of the first and second locations.

* * * * *